US012753030B2

(12) United States Patent
Shuttleworth

(10) Patent No.: US 12,753,030 B2
(45) Date of Patent: Oct. 6, 2026

(54) RAMP ASSEMBLY KIT FOR A CONTAINER

(71) Applicant: Timothy G. Shuttleworth, Fairview, PA (US)

(72) Inventor: Timothy G. Shuttleworth, Fairview, PA (US)

(73) Assignee: Timothy G. Shuttleworth, Fairview, PA (US)

( * ) Notice: Subject to any disclaimer, the term of this patent is extended or adjusted under 35 U.S.C. 154(b) by 351 days.

(21) Appl. No.: 18/628,175

(22) Filed: Apr. 5, 2024

(65) Prior Publication Data

US 2024/0336448 A1 Oct. 10, 2024

Related U.S. Application Data

(60) Provisional application No. 63/457,531, filed on Apr. 6, 2023.

(51) Int. Cl.
*B65G 69/30* (2006.01)
*B65F 1/14* (2006.01)

(52) U.S. Cl.
CPC ................ *B65G 69/30* (2013.01); *B65F 1/14* (2013.01)

(58) Field of Classification Search
CPC ................................ B65G 696/30; B65F 1/14
USPC ........................................... 14/18, 69.5, 77.1
See application file for complete search history.

(56) References Cited

U.S. PATENT DOCUMENTS

| | | | |
|---|---|---|---|
| 4,203,755 | A | 5/1980 | Ruckstuhl |
| 4,339,265 | A | 7/1982 | Engelmann |
| 4,483,704 | A | 11/1984 | Easter, II |
| 4,521,517 | A | 6/1985 | Gauthier |
| 4,798,801 | A | 1/1989 | Hitzman |
| 4,798,802 | A | 1/1989 | Ryan |
| 5,190,572 | A | 3/1993 | Long |
| 5,312,754 | A | 5/1994 | Bryan-Brown |
| 5,354,349 | A | 10/1994 | Inoue |

(Continued)

FOREIGN PATENT DOCUMENTS

| | | | | |
|---|---|---|---|---|
| DE | 202019005545 U1 * | 12/2020 | ................ | B60P 3/07 |
| JP | 2012144430 A | 8/2012 | | |

OTHER PUBLICATIONS

Fuchs, John, (Mar. 30, 2012), Reducing Flow vs. Reducing Pressure—Which is it? (Year: 2012).
The Process Piping Document (Year: 2017).

*Primary Examiner* — Raymond W Addie
(74) *Attorney, Agent, or Firm* — K&L Gates LLP

(57) ABSTRACT

A ramp is disclosed. The ramp can be installed in a container to facilitate manual loading of the container, such as manual dumping of loads from a wheelbarrow into the container. The ramp can include a plurality of hangers, a plurality of support rails, and at least one plank. The hangers can be identical and interchangeable. Each support rail can include a sleeve portion and a screw portion. The screw portion can be threadably engaged with the sleeve portion to operatively adjust the length of the support rail. The support rails can be suspended from the hangers and can assume an adjustable vertical distance from the hangers. Extension of the support rails can generate a compressive force to secure the support rails within the container. The support rails can be identical and interchangeable. The planks can be identical and interchangeable. The supports are configured to releasably hold a plank therebetween.

20 Claims, 10 Drawing Sheets

(56) References Cited

U.S. PATENT DOCUMENTS

| | | | | |
|---|---|---|---|---|
| 5,407,809 | A | 4/1995 | Finn | |
| 5,409,831 | A | 4/1995 | Wright | |
| 5,417,736 | A | 5/1995 | Meyer | |
| 5,593,272 | A | 1/1997 | Green | |
| 5,597,732 | A | 1/1997 | Bryan-Brown | |
| 6,281,001 | B1 | 8/2001 | McNelly | |
| 6,382,585 | B1 | 5/2002 | Pubben et al. | |
| 6,383,369 | B2 | 5/2002 | Elston | |
| 7,833,781 | B2 | 11/2010 | Thurot | |
| 7,989,200 | B2 | 8/2011 | Morrison | |
| 9,044,795 | B2 | 6/2015 | Tyler | |
| 11,111,188 | B2 | 9/2021 | Shuttleworth | |
| 2004/0232021 | A1* | 11/2004 | Linton .................. | B65D 85/68 206/335 |
| 2012/0021504 | A1 | 1/2012 | Bradlee | |
| 2023/0302312 | A1* | 9/2023 | Kneer .................. | B65D 90/045 |

* cited by examiner

RAMP ASSEMBLY KIT FOR A CONTAINER

CROSS-REFERENCE TO RELATED APPLICATION

The present application claims the benefit of priority under 35 U.S.C. § 119 (e) to U.S. Patent Application Ser. No. 63/457,531, entitled RAMP ASSEMBLY KIT FOR A CONTAINER, filed on Apr. 6, 2023, which is incorporated by reference herein in its entirety.

BACKGROUND

In certain instances, roll-off containers and/or dumpsters can be loaded with bulk material manually. For example, a handcart or wheelbarrow can be loaded with bulk material and manually pushed into the container. Due to the large size of such containers, manual loading may be physically demanding and/or time-consuming. Moreover, it may be difficult, impermissible, or undesirable to permanently modify the container to facilitate manual loading thereof.

FIGURES

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Roll-off waste containers, or similar dumpster containers, are used extensively in the waste management industry. Similarly, intermodal containers are used extensively in the transportation industry. Roll-off waste containers, dumpster, and intermodal shipping containers are readily available and can often be obtained at a relatively low-cost. Such containers can be utilized in a variety of industries, including agriculture and farming, for example. For example, second-hand containers can be repurposed for alternative purposes, such as composting, for example, as further described herein.

Figure 1:
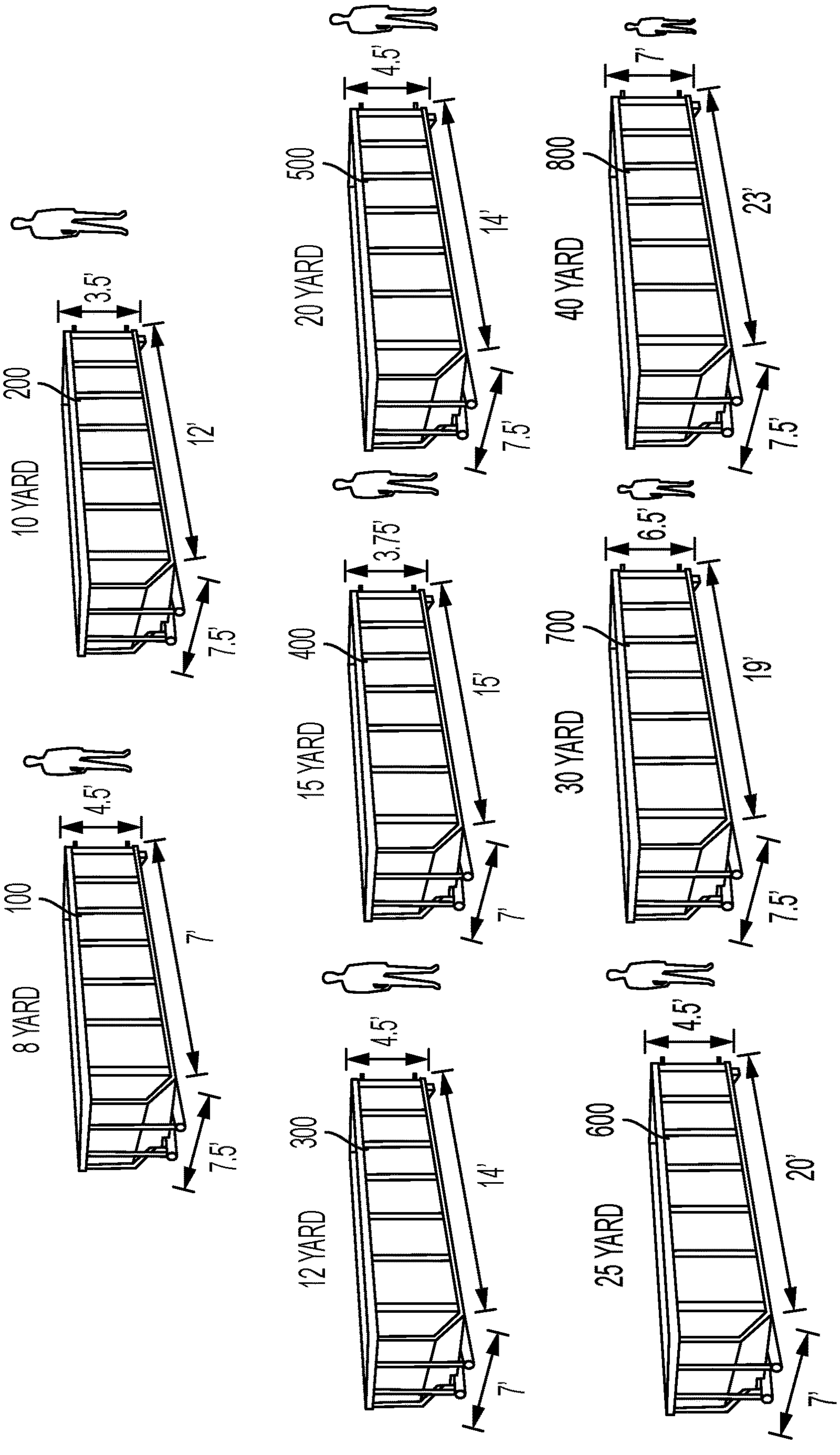
FIG. 1 depicts exemplary roll-off containers, according to various aspects of the present disclosure.

Exemplary open-top roll-off containers are shown in FIG. 1. For example, FIG. 1 depicts an 8 cubic-yard container 100, a 10 cubic-yard container 200, a 12 cubic-yard container 300, a 15 cubic-yard container 400, a 20 cubic-yard container 500, a 25 cubic-yard container 600, a 30 cubic-yard container 700, and a 40 cubic-yard container 800. Alternative size and geometry containers having a substantially cuboid shape, which may be readily available in certain geographic areas, are also contemplated.

Each container 100, 200, 300, 400, 500, 600, 700, and 800 includes a floor, four sides, and an open top. A door is positioned on one of the four sides for each container 100, 200, 300, 400, 500, 600, 700, and 800. The doors can form one entire side of each container 100, 200, 300, 400, 500, 600, 700, and 800, respectively. In other instances, the doors can form a portion of a side wall. The doors open along upright, vertically-spaced hinges; however, other door opening arrangements (e.g. sliding, folding, etc.) are envisioned.

The footprint and geometry of the containers 100, 200, 300, 400, 500, 600, 700, and 800 is configured to fit the container onto the bed of a truck or other vehicle for transportation and/or unloading (e.g. dumping of the contents therefrom).

The containers and similarly-shaped cuboid containers can be used with the various ramp systems and loading/unloading methods described herein. However, the reader will readily appreciate that the various ramp systems and loading/unloading methods described herein can be used in connection with other containers as well.

In various instances, raw material can be composted in a container, such as in a commercially-available, roll-off waste container (see, e.g. FIG. 1), dumpster, or open-top intermodal shipping container. In various instances, these containers can be utilized for composting without permanent modifications being made thereto, which can be economically advantageous, for example.

In certain instances, aeration of raw material that is loaded into a container for composting can be provided by a ductwork system including conduits, pipes, tubes, or ducts that enter the container through the open-top and are arranged along a solid floor of the container. The ductwork system can be installed and maintained in position without modifying the container. For example, the solid walls and the floor, or bottom surface, of the containers 100, 200, 300, 400, 500, 600, 700, and 800 can remain unchanged, e.g., free of additional screw holes, slits, or other openings. Container-based composting is further described in U.S. Pat. No. 11,111,188, titled CONTAINER-BASED COMPOSTING, which issued Sep. 7, 2021, and U.S. Provisional Patent Application No. 63/417,159, titled COUPLINGS FOR CONTAINER BASED COMPOSTING, filed Oct. 18, 2022, which are both incorporated by reference herein in their respective entireties.

Figure 2:
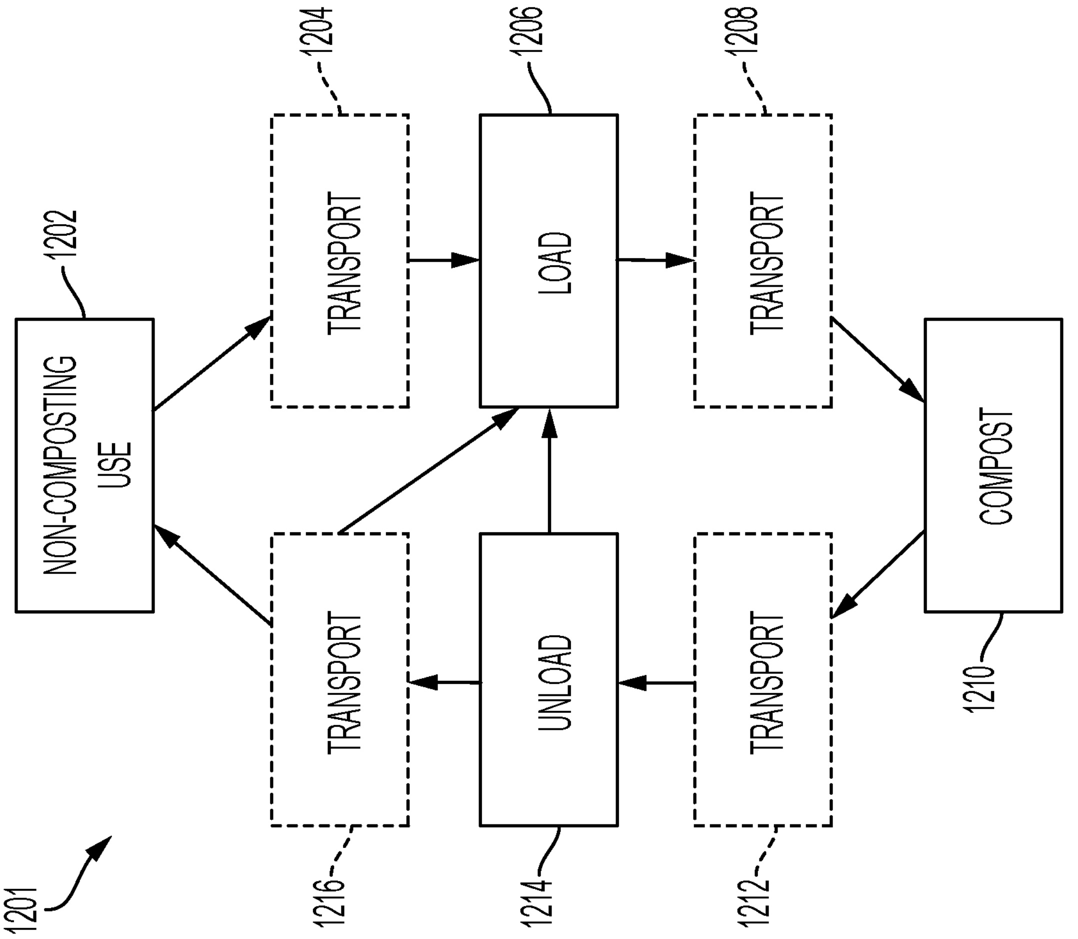
FIG. 2 is a flowchart depicting composting cycles, according to various aspects of the present disclosure.

Referring primarily to FIG. 2, a flowchart 1201 depicting exemplary composting sequences is depicted. Initially, the container for a composting system can be engaged in a non-composting use at block 1202. The container can then be repurposed for composting. For example, the container can be loaded with the additional components of the composting system and with raw material at block 1206. The various ramp systems disclosed herein can be utilized for loading the raw material at block 1206. Optionally, the container can be relocated at block 1204. For example, the container alone or the container in combination with the additional components for the composting system can be leased from a lessor and delivered to the lessee. After the container is loaded at block 1206, the composting cycle can be completed at block 1210. Optionally, the container can be relocated at block 1208 between loading and composting. For example, the container can be transported to a different location on the lessee's property, the lessor's property, and/or a third party's property. Upon completion of the composting cycle, the container can be unloaded at block 1214. In certain instances, the compost can be unloaded. Additionally or alternatively, the components of the composting system (e.g. aeration distributors) can be unloaded. If the container is being returned to a non-composting use at block 1202, the additional components should be removed therefrom. Alternatively, if the container is ready for receipt of additional raw material, the additional components may remain in the container and it can again be loaded with raw material at block 1206. Optionally, the container can be relocated at block 1212 between composting and unloading. For example, the composted material can be sold to a third party and/or returned to the lessor within the container at block 1212. After the container is unloaded, it can be transported at block 1216 to a new site (e.g. a new lessee) at block 1206 and/or to a non-composting use at block 1202.

The reader will appreciate that the flowchart described above with respect to FIG. 2 can apply to the containers in FIG. 1, to multiple containers and/or to different sized containers. The container is filled with raw material at block 1206 and transformed compost is unloaded at block 1214. A lessor of the container and/or composting system can then distribute the composted material and relocate the container to minimize expenses and maximize profits. For example, the composted material can easily be transported to regions having a high demand for compost before it is relocated or delivered to another lessee. In various instances, composting at block 1210 can occur during a portion of a transportation route to maximize use of the container during the composting cycle. In such instances, the container can serve dual purposes as a composting vessel and shipping or transportation container.

The composting method disclosed in FIG. 2 provides an exemplary instance in which a roll-off container or dumpster would be loaded with bulk material. Alternative uses for such containers are also contemplated. Loading and/or unloading of material into a container may be completed with a machine. For example, a tractor can back against, adjacent to, and/or into the container and dump the bulk material therein. Moreover, the container can be tipped by heavy machinery to dump the bulk material out.

In other instances, loading and/or unloading can be performed manually. Manual operations can be preferred in certain instances based on space, environment, noise, and/or exhaust considerations, as well as safety concerns. For example, motorized machines (e.g. a tractor with a front bucket, a fork lift, etc.) may be disruptive at certain times. Moreover, physical constraints, such as a narrow doorway and/or low overhead clearance, for example, may necessitate use of a handcart in place of a motorized machine.

In certain instances, efficiencies may arise with manual operations such that an individual can avoid double-handling or otherwise over-handling the material (e.g. initially using a wheelbarrow to move the material to a first location, then using a tractor to move the material and/or multiple wheelbarrow loads of the material to a second location). Instances of over-handling the material violate the OHIO principle, i.e. Only-Handle-It Once-principle, of efficiency. Depending on the material, environmental concerns may also arise when material is over-handled because the material may accumulate over a period of time at the intermediate location, which can lead to leaching from the material into surface waterways, especially during periods of rain or other precipitation, for example. In various instances, observing the OHIO principle of efficiency when loading a container can save time and/or money and may also protect the environment.

Fully loading a shipping container and/or dumpster, such as those depicted in FIG. 1, with a wheelbarrow can pose many challenges. An individual can push a wheelbarrow, handcart, or other rolling cart filled with bulk material into the container and dump the bulk material therein, however, it may require several loads before a large container is filled. In such instances, it can be difficult to completely fill the container as the ground level of the container becomes filled with material. More specifically, the individual may have to walk through and/or over the material, for example, which may be dirty, hazardous, challenging, and/or impractical in certain instances. Moreover, compression of the raw material by a person and/or loaded handcart traveling over the raw material may be undesirable in certain instances. Compaction of the raw material may inhibit a subsequent composting cycle within the container, for example.

In various aspects, a ramp assembly kit can be assembled within a container to facilitate loading of the container, for example. A ramp assembly kit can include hangers, horizontally-oriented support rails suspended between opposed hangers, and at least one inclined plank suspended between adjacent support rails, as further described herein. In various instances, various components of the ramp assembly kit can be modular and interchangeable.

In various instances, the ramp assembly kit can be adjustable. For example, the ramp assembly kit can be assembled in multiple different configurations depending on the size of the container, the size of the wheelbarrow, and the current fill-level of the container. As the container is further filled with material, the ramp assembly kit can be at least partially disassembled and/or loosened, then moved and reassembled and/or retightened in a new configuration to further facilitate loading of the container. In various instances, as further described herein, the ramp assembly kit can be loosened and shifted longitudinally and/or retightened without disassembling the ramp. For example, components of the ramp assembly kit (e.g. the horizontal support rails) can be loosened and/or unclamped, and the entire ramp assembly can be shifted, as a unit, to a new location before tightening and/or re-clamping the ramp assembly kit components in position within the container.

Figure 3:
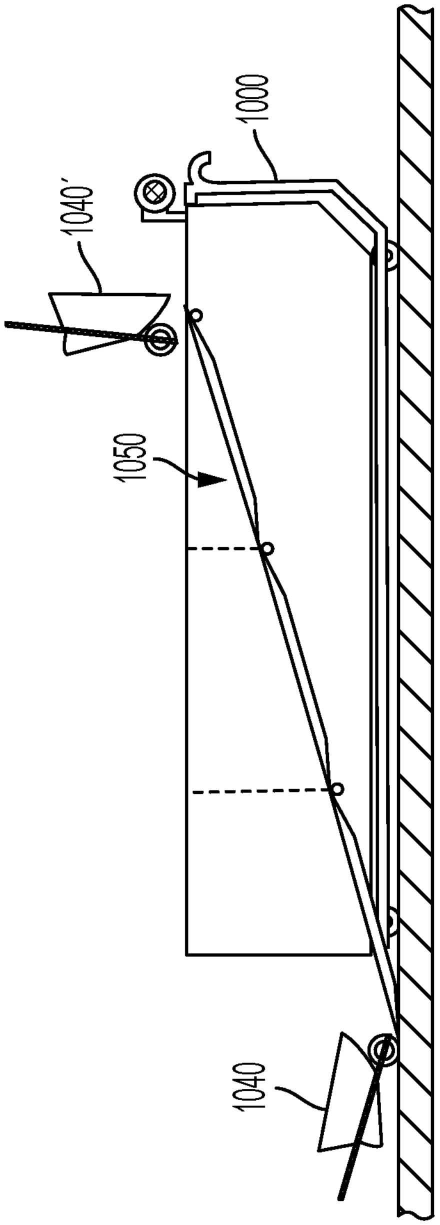
FIG. 3 is a schematic of a container having a ramp assembly installed therein, wherein the ramp assembly is shown in a first position, according to various aspects of the present disclosure.
Figure 4:
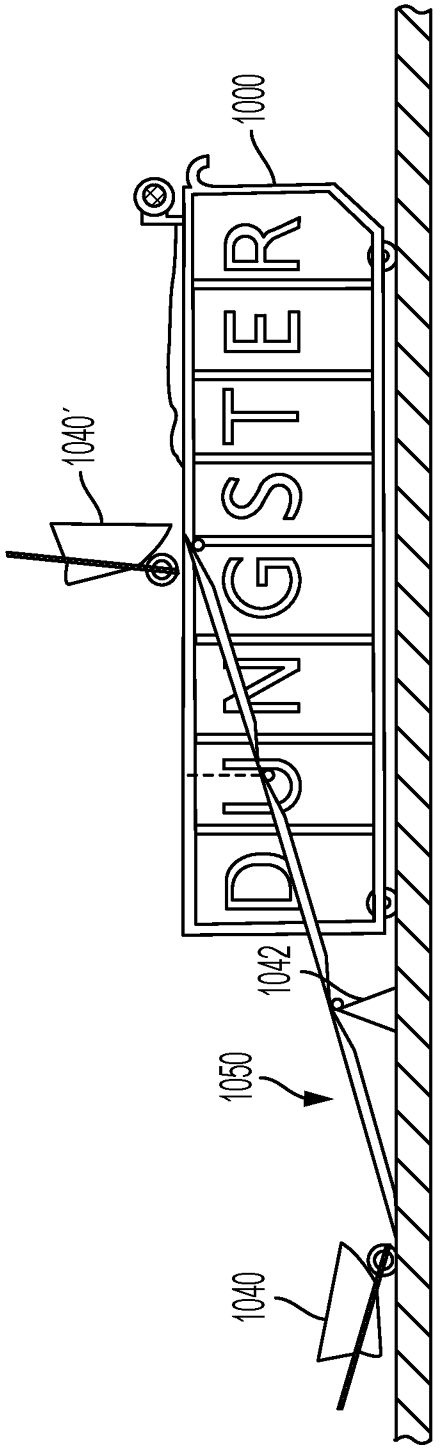
FIG. 4 is a schematic of the container and the ramp assembly of FIG. 5, depicting the ramp assembly in a second position in which the ramp assembly is shifted rearwardly from the first position through an open door of the container, according to various aspects of the present disclosure.

Referring now to FIGS. 3 and 4, schematics of a ramp assembly 1050 installed within a container 1000 are shown. The ramp assembly 1050 provides an inclined surface for a wheelbarrow 1040 or other handcart to move material into the container 1000. In FIG. 3, the ramp assembly 1050 in shown in a first installed position within the container 1000; in FIG. 4, the ramp assembly 1050 is shown in a second installed position within the container 1000. In the second installed position, the ramp assembly 1050 has been shifted from the first position through an open door of the container 1000. For example, upon filling the portion of the container 1000 farthest from the door by dumping material from the top of the ramp into the container 1000, the ramp assembly can be at least partially disassembled and reassembled to load an intermediate portion of the container 1000 adjacent to the filled end. For example, the ramp assembly can be partially disassembled and shifted longitudinally, then reassembled in the new position. In various instances, a high drop point can be maintained to permit complete filling of each adjacent longitudinal section of the container 1000 vertically.

As further described herein, in the first installed position (FIG. 3), the ramp assembly 1050 is supported at three longitudinal points along the length of the container 1000. In the second installed position (FIG. 4), the ramp assembly 1050 is supported at two longitudinal points along the length of the container 1000, and is further supported by a sawhorse, table, or other support 1042 outside of the container 1000 to maintain the same slope along the ramp.

Figure 5:
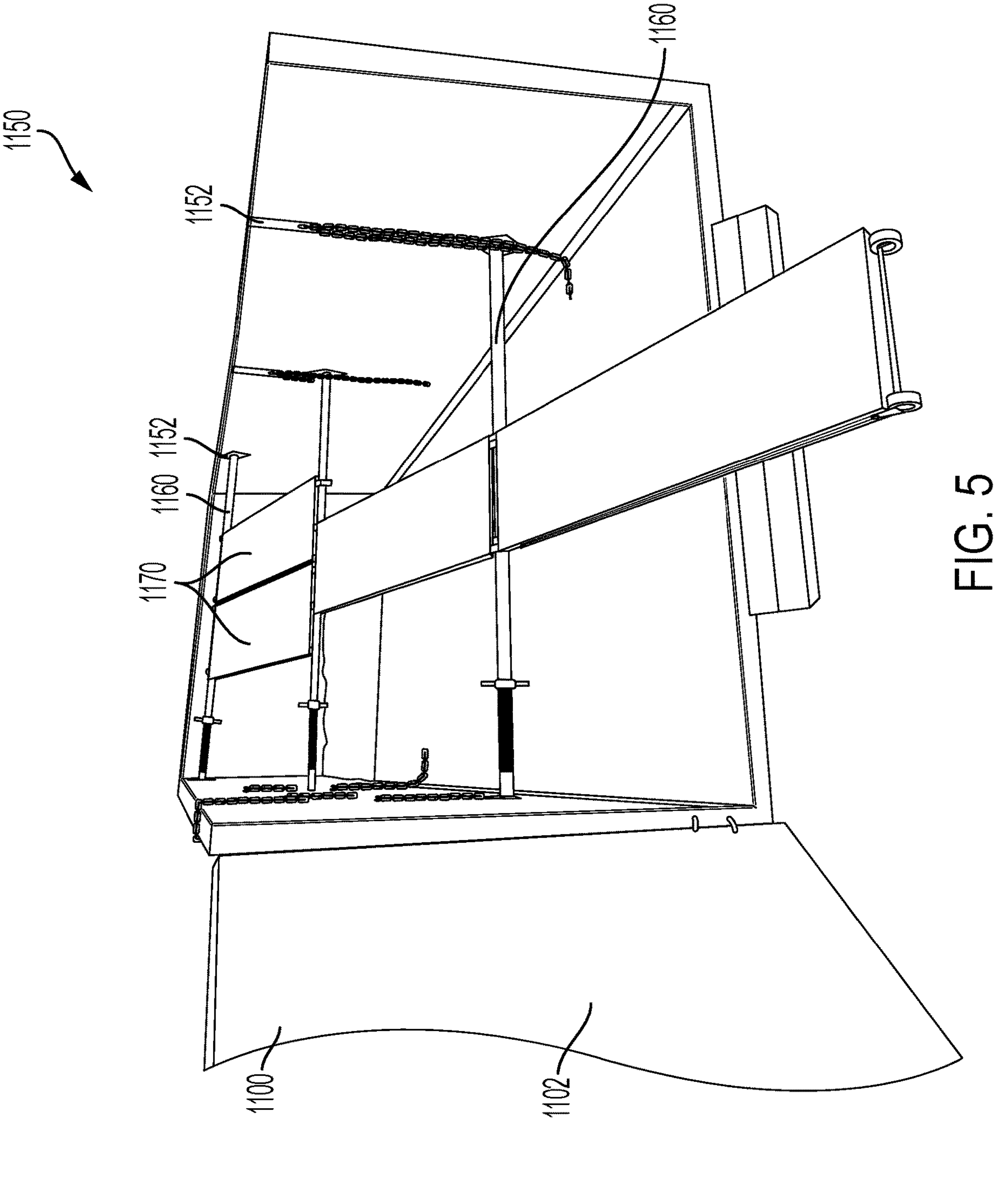
FIG. 5 is a photograph of a portion of a container having a ramp assembly installed therein in a first configuration, according to various aspects of the present disclosure.
Figure 7:
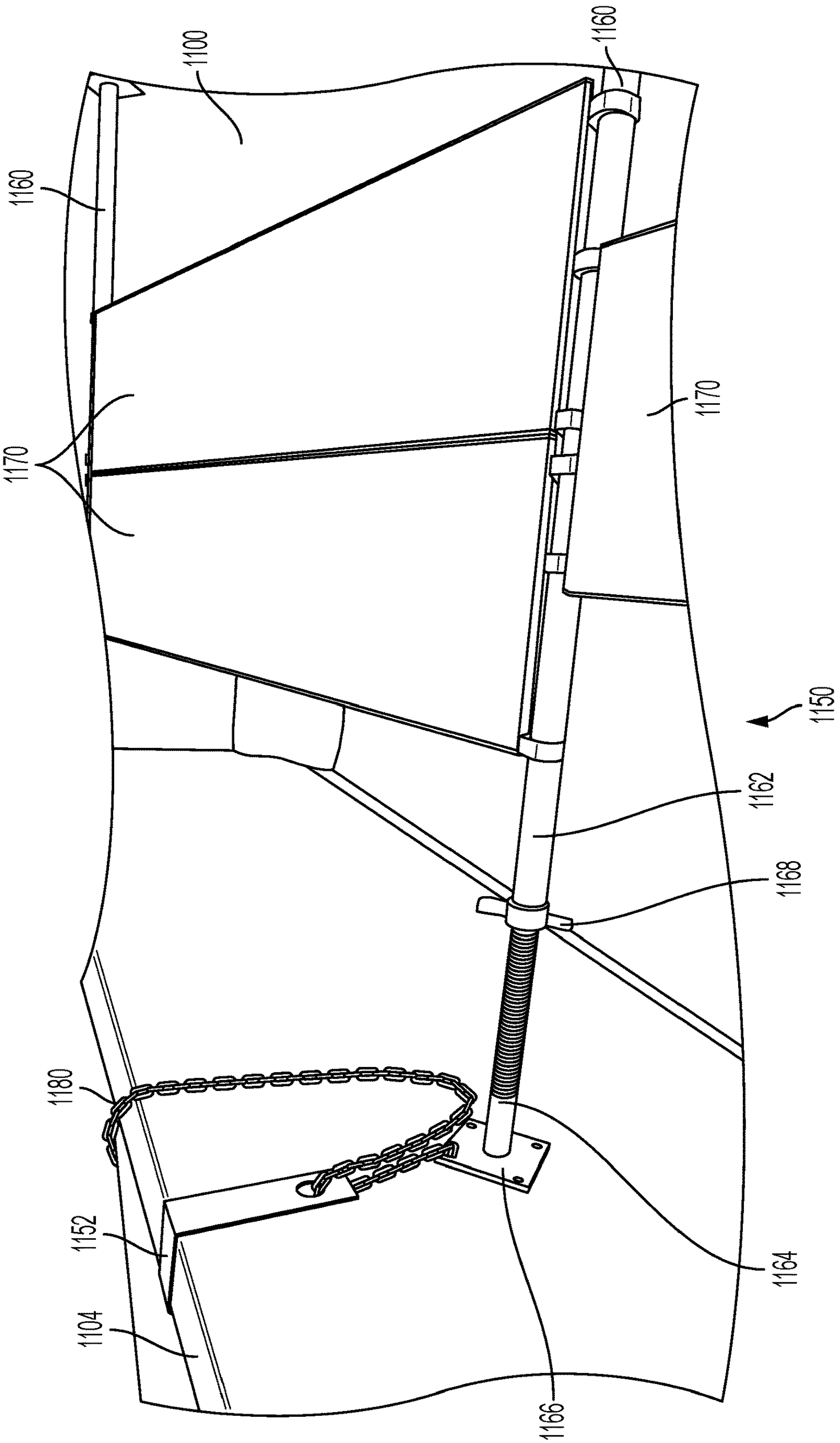
FIG. 7 is a photograph of a portion of the container and the ramp assembly of FIG. 5 installed in the first configuration of FIG. 5, according to various aspects of the present disclosure.
Figure 9:
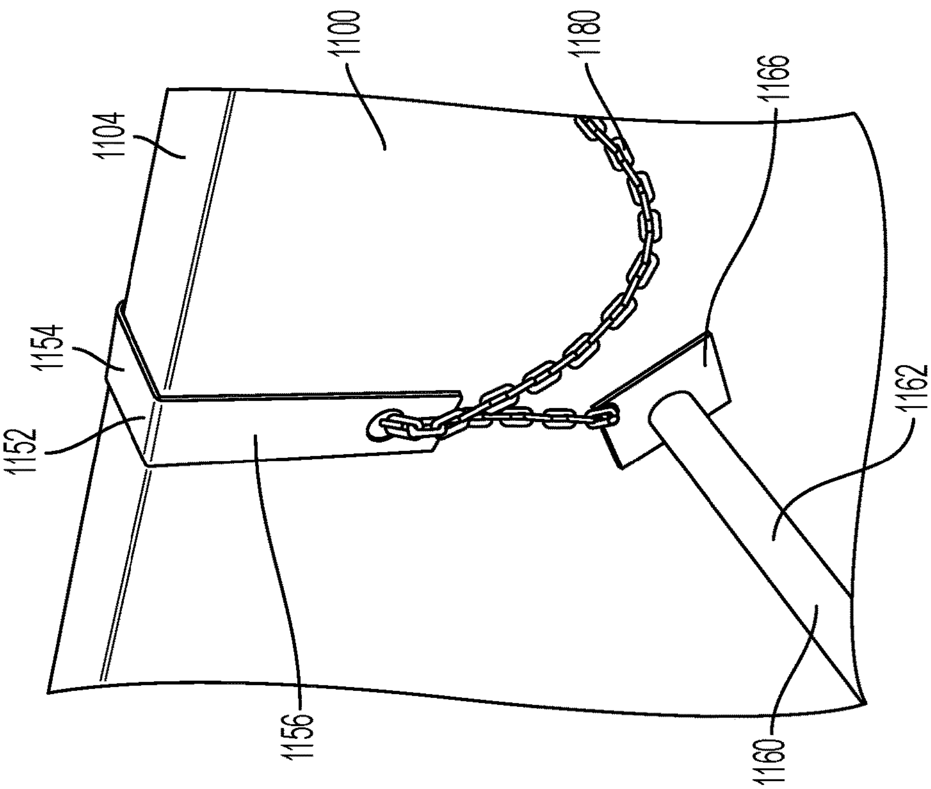
FIG. 9 is a photograph of the container of FIG. 5 and a sleeve end portion of a support rail for the ramp assembly of FIG. 5 installed therein, according to various aspects of the present disclosure.
Figure 8:
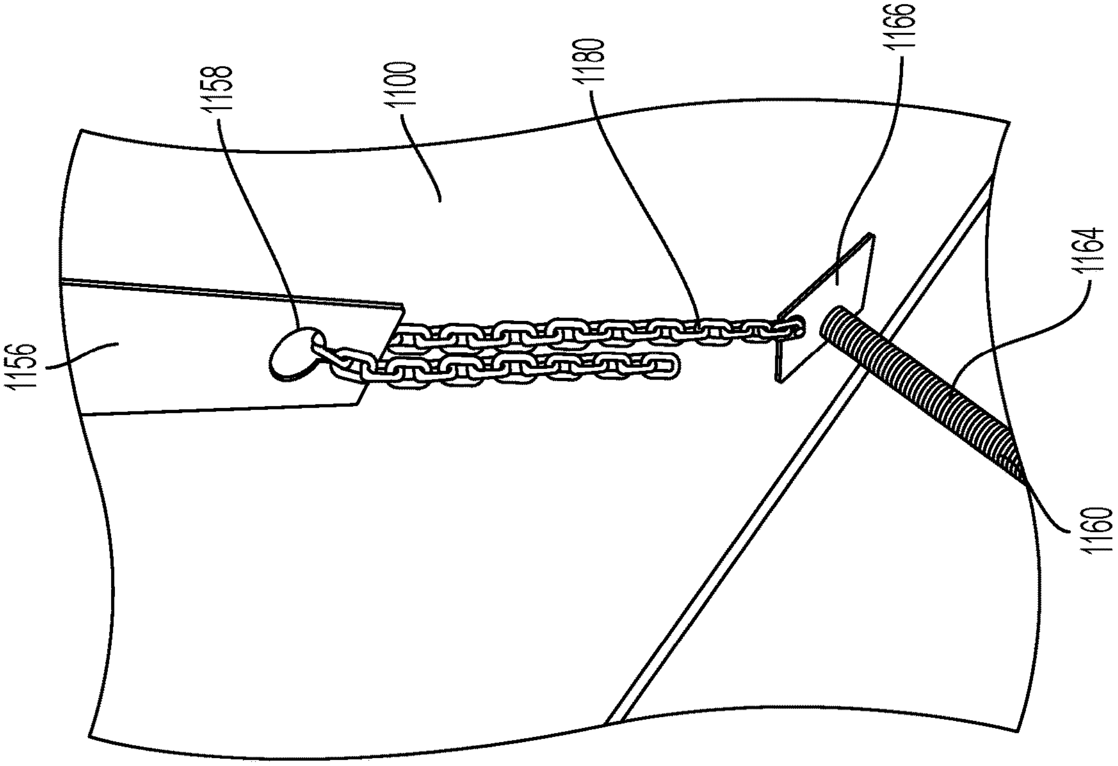
FIG. 8 is a photograph of the container of FIG. 5 and a screw end portion of a support rail of the ramp assembly of FIG. 5 installed therein, according to various aspects of the present disclosure.
Figure 10:
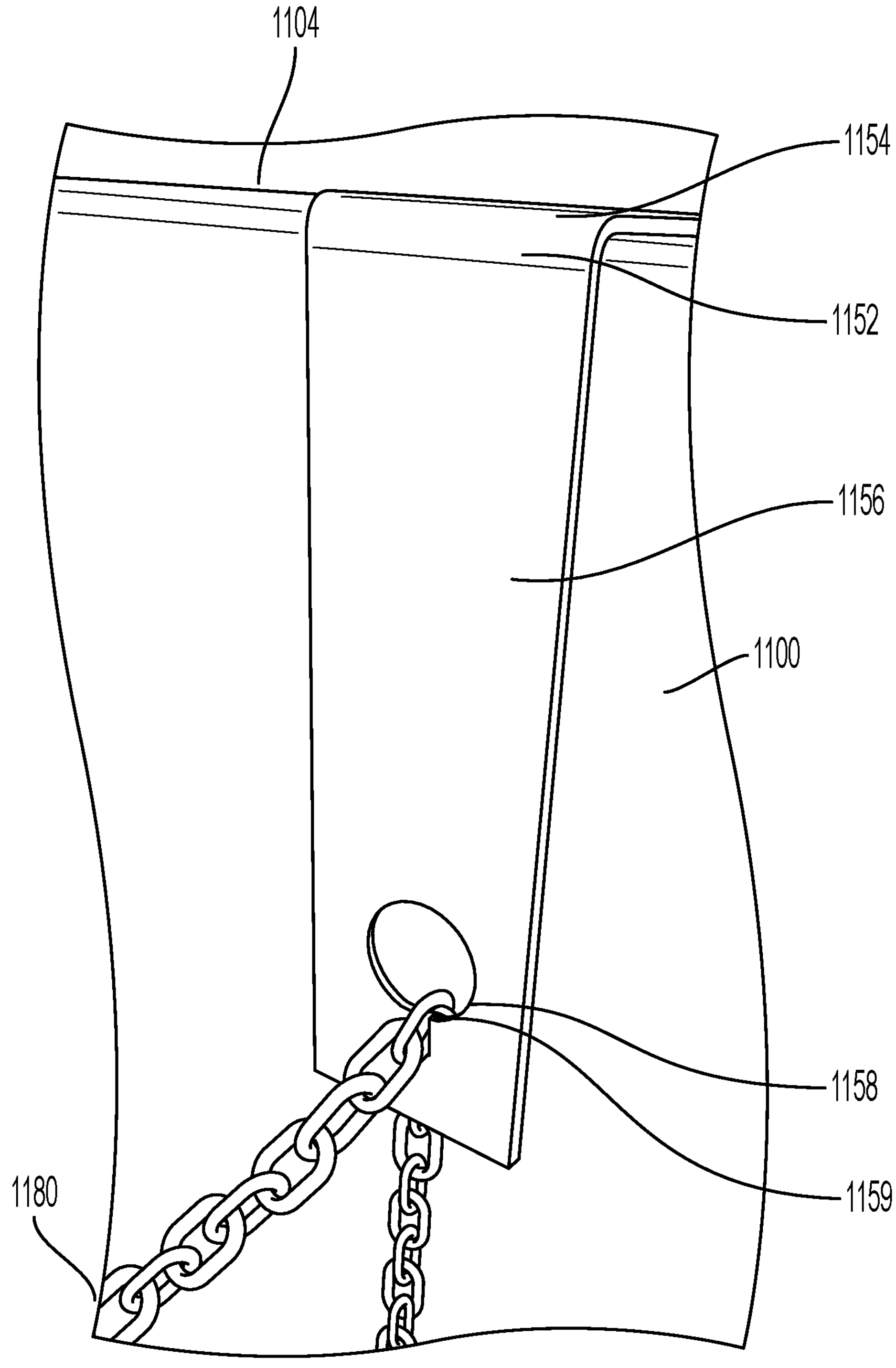
FIG. 10 is a photograph of a hanger of the ramp assembly of FIG. 5 suspended from a side wall of the container of FIG. 5, further depicting a locking notch in the hanger and a chain secured in the locking notch, according to various aspects of the present disclosure.

Referring now to FIG. 5, a ramp assembly 1150 is installed within a container 1100 having a door 1102 at one end thereof. The ramp assembly includes hangers 1152, support rails 1160, and inclined planks 1170. Each hanger 1152 can include a hooked portion 1154 (FIG. 10) that is structured to be hooked over a top rail 1104 (FIG. 7) of the container 1100. Each hanger 1152 can also include a vertical plate 1156 (FIG. 10) suspended from the hooked portion. A vertical hole 1158 is defined in each vertical plate 1156. The vertical hole 1158 is configured to support a horizontally-oriented support rail 1160 therein. In certain configurations, the support rails 1160 can be positioned within the vertical holes 1158. Additionally or alternatively, the support rails 1160 can be supported by a chain 1180 secured within the vertical holes 1158, as further described herein.

The inclined planks 1170 extend between adjacent support rails 1160. For example, the inclined planks 1170 can include first hooks at the first longitudinal end thereof and second hooks at the second longitudinal end thereof. The support rails 1160 can be configured to releasably engage the first hooks and the second hooks to support an inclined plank 1170 therebetween. In various instances, the first hooks can be laterally-spaced along the first longitudinal end, and the second hooks can be laterally-spaced along the second longitudinal end.

The planks 1170 in the ramp assembly 1150 can be identical and interchangeable. In various instances, at least two planks can be configurable end-to-end and/or at least two planks can be configurable side-to-side.

In certain instances, the planks 1170 can be scaffolding planks, which can be commercially available through equipment rental companies, for example. The planks 1170 can be 16 to 24 inches wide and 6 to 8 feet long. In other instances, the planks can be longer than 24 inches wide and/or 8 feet long. Alternative dimensions are contemplated.

In at least one configuration, the planks 1170 can be positioned in a single end-to-end row.

In other configurations, the planks 1170 can be positioned double-wide or triple-wide, for example, along a portion of the ramp assembly 1150. For example, the planks 1170 can be configured one-wide at the lowest level, two-wide at the intermediate level, and three-wide at the highest level.

Each support rail 1160 defines a generally cylindrical rod and includes a tubular sleeve portion 1162 and a screw portion 1164. The screw portion 1164 is threadably engaged with internal threads on a wingnut 1168 opposed against the sleeve portion 1162. Rotation of the wingnut 1168 in a first direction extends the screw portion 1164 relative to the sleeve portion 1162 until the compression plates 1166 are pushed against the longitudinal sidewalls to frictionally engage the container 1100. Rotation of the wingnut 1168 in the opposite direction retracts the screw portion 1164 relative to the sleeve portion 1162 to release compression against the sidewalls of the container 1100.

In other instances, the sleeve portion 1162 can have internal threads to adjust the length of the support rail to traverse the width of the container 1100.

The sleeve portion 1162 terminates at a sleeve end structured to fit within the vertical hole 1158 of the vertical plates 1156. The screw portion 1164 terminates at a screw end structured to fit within the vertical hole 1158 of another of the vertical plates 1156 that is spaced apart by the width of the container 1100. Upon positioning each support rail 1160 within the container 1100 (e.g. by positioning the sleeve end portion and the screw end portion within a hole and/or by securing chains attached to the support within locking notches), the screw portion 1164 of the support rail 1160 can be rotated, e.g. at the wingnut/crank 1168 (FIG. 7), to further extend the length of the support rail 1160 and generate a compressive force therein between the parallel, longitudinal sidewalls of the container 1100.

Referring to the embodiment in FIG. 5, the ramp assembly 1150 includes three support rails 1160; however, less than three support rails and/or more than three supports are also contemplated. For example, a ramp assembly may only include two support rails in various aspects of the present disclosure.

The support rails 1160 are identical and interchangeable. For example, each support rail 1160 can be positioned at any of the longitudinal locations along the length of the container 1100.

The ends of the support rails 1160 define compression plates 1166. For example, the sleeve end and the screw end of each support rail 1160 terminates at a compression plate 1166, which is configured to engage the sidewalls of the container 1100 to distribute the compressive force thereto.

Figure 6:
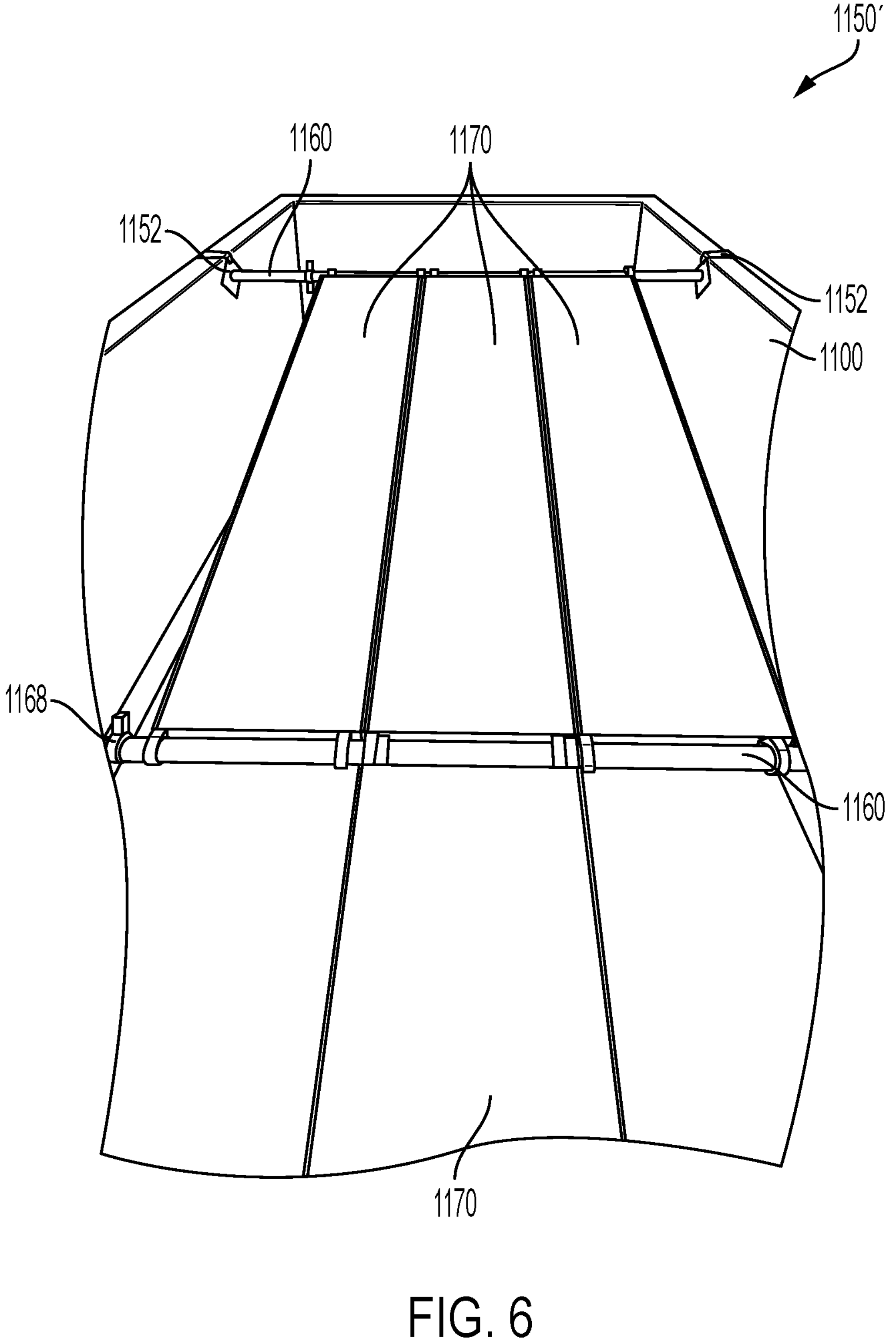
FIG. 6 is a photograph of a portion of the container and a portion of the ramp assembly of FIG. 5 installed in a second configuration, according to various aspects of the present disclosure.

The ramp assembly 1150 can be assembled and disassembled in different configurations, in different positions relative to the container 1100, and/or within different containers. For example, referring to FIG. 6, the ramp assembly 1150' is shown in another configuration in which an additional inclined plank 1170 is added to provide a wider ramp along the top portion thereof. In other instances, a wider ramp can be provided with additional inclined planks 1170 along the length of the ramp assembly 1150 or portion thereof. In still other instances, a narrow ramp can be installed having fewer inclined planks 1170 than shown in the ramp assembly 1150 in FIG. 5.

The hangers 1152 are identical and interchangeable. For example, each hanger 1152 can be positioned at any of the longitudinal locations along the length of the container 1100.

Referring primarily now to FIGS. 7-10, each hanger 1152 includes a vertical plate 1156 and each vertical plate 1156 includes a vertical hole 1158 defined in the vertical plate 1156. A locking notch 1159 is also defined in each vertical plate 1156. The locking notch 1159 extends radially outward from the vertical hole 1158 and provides a catch for a linkage of the chain 1180. The vertical hole 1158 and the locking notch 1159 form a keyhole shape in the vertical plate 1156.

The chain 1180 is selectively lockable within the locking notches 1159 to adjust the length of the chain 1180. As a result, the vertical distance between the top rail of the container 1100 and the support rail 1160 can be adjusted. In various instances, the relative height of the support rails 1160 and distance therebetween controls the incline of the ramp assembly 1150.

In various instances, the ramp assembly 1150 can be used inside the container at variable degrees of inclination. Additionally or alternatively, it can be shifted longitudinally from the non-door end toward the door end of the container 1100 as the loaded capacity of the container 1100 increases. For example, the distal or far end of the ramp assembly 1150 can initially be positioned within the container 1100 and positioned to provide a dumping region off the end thereof into the far end of the container 1100. Thereafter, the threaded connection between the portions 1162, 1164 of the support rails 1160 can be adjusted (e.g. rotation of the wingnut 1158) to release compression in the support rails 1160. Thereafter, the hangers 1152 can be slid along the top surface of the longitudinal sidewalls of the container 1100 toward the door 1102. The threaded connection between the portions 1162, 1164 can then be readjusted (e.g. rotation of the wingnut 1158 in the opposite direction) to re-secure the ramp assembly in the new position closer to the door 1102 of the container 1100. In various instances, the planks 1160 can remain engaged with and supported by the hangers 1152 as the hangers 1152 are shifted longitudinally. In such instances, the entire ramp assembly can shift as a unit toward the door 1102 of the container 1100.

In certain instances, the hangers 1152 can include wheels, casters, and/or rollers for facilitating displacement of the hangers 1152 along the length of the container 1100. Additionally or alternatively, one of more of ends of one or more of the planks 1170 can include wheels, casters, and/or rollers to facilitate displacement of the longitudinal end positioned against the bottom surface of the container and/or external surface, for example.

The chain 1180 is also connectable to the support rail 1160. For example, the chain 1180 can be fastened to the compression plate by a bolt extending through a hole in the compression plate and affixed to the chain 1180.

In other embodiments, a quick disconnect linkage can be used to encircle the end of the chain 1180 around the elongate portion of the support rail 1160 to securely suspend the support rail 1160 from the chain 1180, which is releasably locked to the hanger 1152 via the locking notch 1159, for example.

Referring again to FIG. 5, the topmost support rails 1160 are positioned within the vertical holes 1158 in the hangers 1152, whereas the lower support rails 1160 are vertically spaced from the vertical holes 1158 of their respective hangers 1152 by the chains 1180, which are engaged with the locking notches 1159 in the hangers 1152.

In various instances, the ends of the support rail 1160 can be positioned within the vertical holes 1158 before the sleeve portion 1162 is threadably coupled to the screw portion 1164. Upon connecting the sleeve portion 1162 and the screw portion 1164, the compression plates 1166 can lock the support rail 1160 onto the hangers 1152.

In various instances, the ramp assembly 1150 can support various accessories. Such assemblies can be supported by and/or suspended from a component of the ramp assembly 1150 (e.g. a hanger 1152, a support rail 1160, and/or a plank 1170).

For example, the ramp assembly 1150 can include one or more lighting systems. Lights of a lighting system can be supported and/or suspended from a component of the ramp assembly 1150 such that the container 1100 can be manually loaded after daylight hours. These lights can be solar-powered, battery-powered, and/or wired to a power source.

Additionally or alternatively, the ramp assembly 1150 can support misting and/or other fluid-dispensing nozzles. In arid environments, misting can limit and/or prevent the generation of dust. In various instances, misting can encourage composting and/or prevent and/or control fires. In various instances, the ramp assembly 1150 can support a dosing system. For example, additives and/or agents can be added to water that is pumped through and supplied by nozzles that are supported and/or suspended from the ramp assembly 1150. Agents can include microbes of composting and/or deodorizing, for example. In certain instances, the misting system can comprise a foam delivery system. Foam can combat dust, for example.

Additionally or alternatively, the ramp assembly 1150 can support post-and-chain barriers, toe-rail supports and/or other fall prevention measures.

Figure 11:
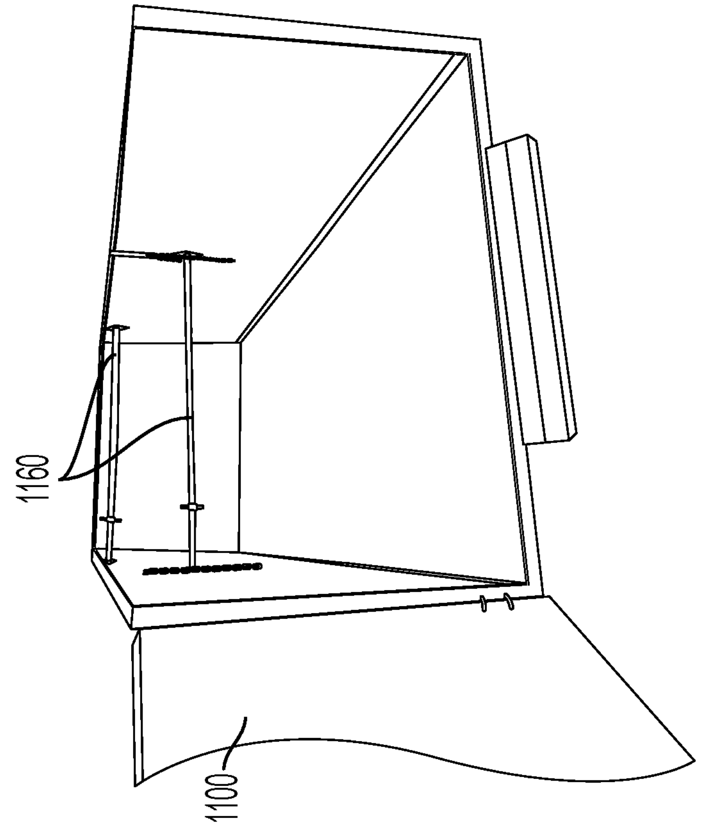
Figure 14:
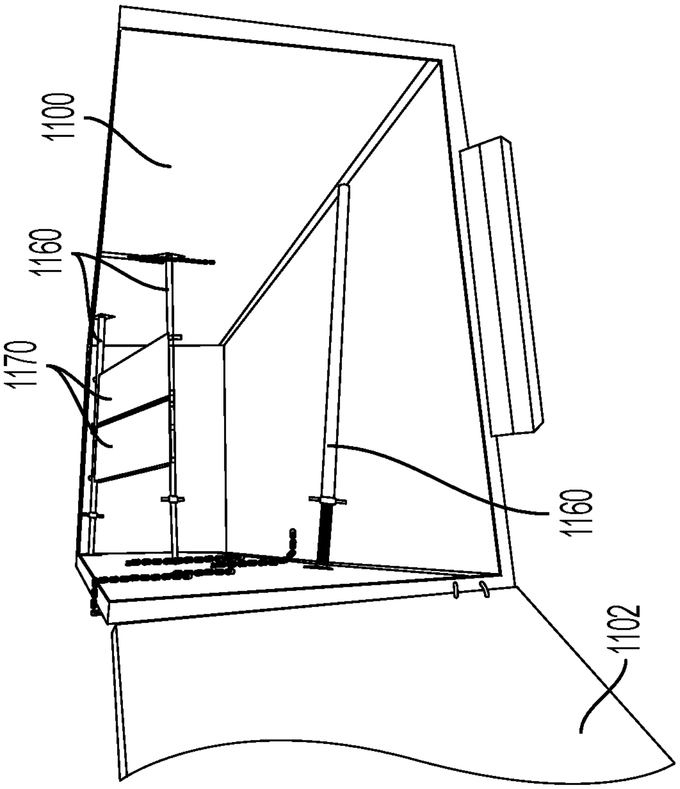

FIGS. 11-14 depict a portion of an installation series for the ramp assembly 1150 in the container 1100. Referring to FIG. 11, a pair of support rails are first positioned across the width of the container 1100. The first (or topmost) support rail 1160 is supported within vertical holes 1158 in the hangers 1152. The second (or intermediate) support rail 1160 is suspended from chains 1180 locked in locking notches 1159 in the hangers 1152. The hangers 1152 can be configured to slide along the top rails of the container 1100 to a suitable longitudinal position. Opposing hangers 1152 across the width of the container 1100 can be longitudinally aligned.

In various instances, gravity can assist in securing the support rails 1160 within the container 1100. Moreover, upon positioning the support rails 1160 in suitable longitudinal positions within the container (e.g. initially with the assistance of gravity to hold the hangers and support rails 1160 in place), the support rails 1160 can be axially extended to push against the sides of the container 1100 and generate a compressive force. For example, the screw portion 1164 of the support rail 1160 can be rotated and, owing to the threaded connection between the screw portion 1164 and internal threads on the sleeve portion 1162, the support rail 1160 can lengthen between the compression plates 1166 on either end thereof. In such instances, the compressive force can be sufficient to secure the support rails 1160 within the container 1100 with and/or without the hanger 1152. In various instances, frictional material and/or surface treatments between the container's sidewalls and the support rails 1160 (and compression plates 1166 thereof) can further enhance the connection between the support rails 1160 and the container 1100.

Similarly, to release the support rails 1160 from the container 1100, the screw portion 1164 can be rotated in the opposite direction to retract the screw portion 1164 relative to the sleeve portion 1162 and threaded wingnut 1168 thereof and, thus, to shorten the distance between the compression plates 1166 thereof. Thereafter, the hangers

1152 can continue to support the support rails 1160 suspended therefrom as the hangers 1152 are repositioned along the length of the container. Additionally, to disassemble the ramp system, the hangers 1152 can support the support rails 1160 until the support rails 1160 are disengaged from the hangers 1152 and removed from the container 1100.

Figure 12:
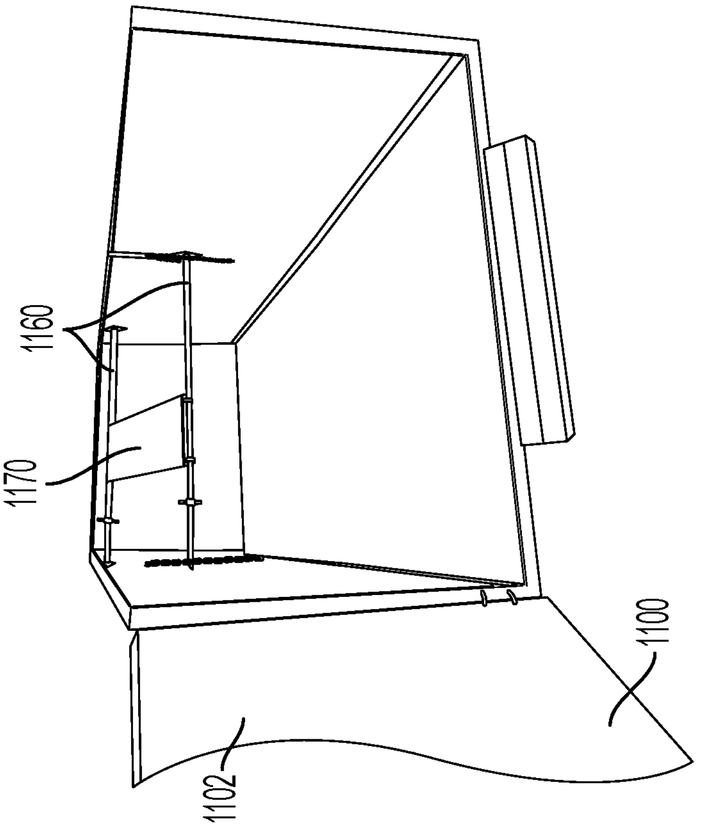
FIGS. 11-14 are a series of photographs depicting an installation series for the ramp assembly of FIG. 5 in the container of FIG. 5, according to various aspects of the present disclosure.
Figure 13:
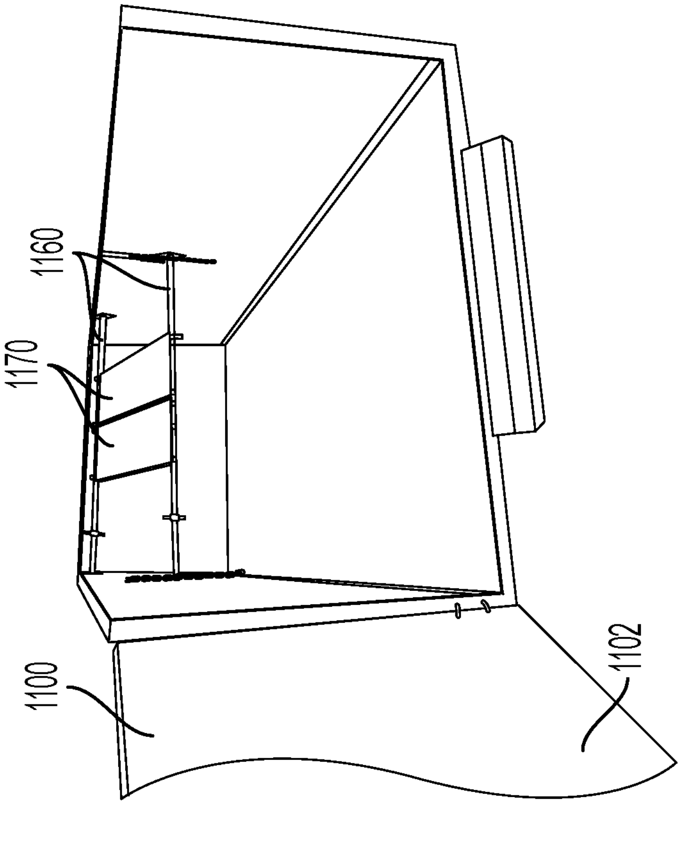

In FIG. 12, the hooks of the plank 1170 are coupled to the support rails 1160 to provide an inclined plank. In FIG. 13, another plank 1170 is added to the ramp assembly 1150 side-by-side with the first plank to provide a wider ramp and, in FIG. 14, another support rail 1160 is being installed in the container 1100 to ultimately extend the length of the ramp. Alternative configurations are also contemplated. Moreover, in certain instances, lower support rails and/or planks can be positioned before the upper support rails and/or planks.

The various ramp assembly kits disclosed herein can be easy to install, easy to adjust, easy to use, and/or easy to remove upon completion of the container-filling process.

As further described herein, the ramp assembly kit can be installed and uninstalled without any power tools.

Moreover, as further described herein, the ramp assembly kit can be secured within the container (e.g. suspended from the container's top rails) without welding, cutting, drilling, or otherwise permanently modifying the container itself. Avoiding and/or minimizing modifications to the container can maintain the commercial value of the container and permit subsequent uses. In such instances, the container can be rented and/or leased for temporary uses (e.g. composting) and returned to conventional uses (e.g. hauling refuse) thereafter, as further described in U.S. Pat. No. 11,111,188, titled CONTAINER-BASED COMPOSTING, which issued Sep. 7, 2021, and U.S. Provisional Patent Application No. 63/417,159, titled COUPLINGS FOR CONTAINER BASED COMPOSTING, filed Oct. 18, 2022, which are both incorporated by reference herein in their respective entireties.

What is claimed is:

1. A ramp assembly kit, comprising:
- a plurality of hangers, wherein each hanger comprises a hook and a vertical plate extending from the hook;
- a plank extending between a first longitudinal end and a second longitudinal end, the plank comprising first hooks at the first longitudinal end and second hooks at the second longitudinal end;
- a plurality of supports comprising a first support and a second support, wherein the first support comprises:
  - a first sleeve terminating at a first sleeve end, wherein a first vertical plate is structured to support the first sleeve end; and
  - a first screw portion terminating at a first screw end, wherein a second vertical plate opposite the first vertical plate is structured to support the first screw end, and wherein the first screw portion is threadably engaged with the first sleeve to operatively adjust the length of the first support; wherein the second support comprises:
  - a second sleeve terminating at a second sleeve end, wherein a third vertical plate is structured to support the second sleeve end; and
  - a second screw portion terminating at a second screw end, wherein a fourth vertical plate opposite the first vertical plate is structured to support the second screw end, and wherein the second screw portion is threadably engaged with the second sleeve to operatively adjust the length of the second support;
- wherein the first support and the second support are configured to releasably engage the first hooks and the second hooks to support the plank therebetween.

2. The ramp assembly kit of claim 1, wherein the plurality of supports are identical and interchangeable.

3. The ramp assembly kit of claim 2, wherein the first sleeve end comprises a first compression plate, and wherein the first screw end comprises a second compression plate.

4. The ramp assembly kit of claim 2, wherein each support further comprises a wingnut for rotatably adjusting the length thereof.

5. The ramp assembly kit of claim 2 further comprising:
- a second plank extending between a first longitudinal end and a second longitudinal end, the second plank comprising first hooks at the first longitudinal end and second hooks at the second longitudinal end; and
- a third support comprising:
  - a third sleeve terminating at a third sleeve end, wherein a fifth vertical plate is structured to support the third sleeve end; and
  - a third screw portion terminating at a third screw end, wherein a sixth vertical plate opposite the fifth vertical plate is structured to support the third screw end, and wherein the first screw portion is threadably engaged with the first sleeve to operatively adjust the length of the first support, wherein the ramp assembly kit further comprises a second plank wherein the first support and the second support are configured to releasably engage the first hooks and the second hooks to support the plank therebetween;
- wherein the second support and the third support are configured to releasably engage the first hooks and the second hooks to support the second plank therebetween.

6. The ramp assembly kit of claim 1, wherein the plurality of hangers are identical and interchangeable.

7. The ramp assembly kit of claim 6, wherein each vertical plate comprises:
- a vertical hole defined in the vertical plate;
- a locking notch defined in the vertical plate and extending radially outward from the vertical hole.

8. The ramp assembly kit of claim 7, further comprising a plurality of chains, wherein the chains are selectively lockable within the locking notches to adjust the length of the chain extending from the vertical hole.

9. The ramp assembly kit of claim 8, wherein the vertical hole in the first vertical plate is structured to receive and hold the first sleeve end, wherein the vertical hole in the second vertical plate is structured to receive and hold the first screw end, wherein the locking notch in the third vertical plate is structured to receive and hold a first chain coupled to the second sleeve end, and wherein the locking notch in the fourth vertical plate is structured to receive and hold a second chain coupled to the second screw end.

10. The ramp assembly kit of claim 1, further comprising a plurality of planks, wherein the planks are identical and interchangeable.

11. The ramp assembly kit of claim 10, wherein at least two planks of the plurality of planks are configurable end-to-end.

12. The ramp assembly kit of claim 11, wherein at least two planks of the plurality of planks are configurable side-to-side.

13. The ramp assembly kit of claim 10, wherein the first hooks are laterally-spaced along the first longitudinal end, wherein the second hooks are laterally-spaced along the second longitudinal end.

14. The ramp assembly kit of claim 1, further comprising a container comprising a first longitudinal wall, a second longitudinal wall, and a floor between the first longitudinal wall and the second longitudinal wall, wherein the supports are configured to be laterally extended between the first longitudinal wall and the second longitudinal wall to generate a compressive load therein.

15. The ramp assembly kit of claim 14, wherein the first longitudinal wall comprises a first top rail, wherein the second longitudinal wall comprising a second top rail, and wherein the plurality of hangers are suspended from one of the first top rail and the second top rail.

16. The ramp assembly kit of claim 15, wherein the supports are adjustably positioned along the length and height of the container.

17. The ramp assembly kit of claim 15, wherein the container is selected from a group consisting of a roll-off container, an intermodal shipping container, and a dumpster.

18. A method, comprising:

for a first support rail:

hanging a first hook on a first top rail of a container, wherein a first vertical plate extends from the first hook, and wherein a first hole is defined in the first vertical plate;

hanging a second hook on a second top rail of the container, wherein the first hook and the second hook are longitudinally aligned along the length of the container, wherein a second vertical plate extends from the second hook, and wherein a second hole is defined in the second vertical plate such that the second hole is vertically aligned with the first hole;

positioning a first end of the first support rail in the first hole and positioning a second end of the first support rail in the second hole; and rotating a screw portion of the first support rail to extend the first support rail and generate a compressive load therein;

for a second support rail:

hanging a third hook on the first top rail of the container longitudinally offset from the first hook, wherein a third vertical plate extends from the third hook, and wherein a third hole is defined in the third vertical plate;

hanging a fourth hook on the second top rail of the container longitudinally offset from the second hook, wherein the third hook and the fourth hook are longitudinally aligned along the length of the container, wherein a fourth vertical plate extends from the fourth hook, wherein a fourth hole is defined in the fourth vertical plate such that the fourth hole is vertically aligned with the third hole and vertically offset from the first hole and the second hole;

suspending the second support rail from the third hook and the fourth hook;

rotating a screw portion of the second support rail to extend the second support rail and generate a compressive load therein; and hanging an inclined plank between the first support rail and the second support rail.

19. The method of claim 18, further comprising:

repeating the hanging, suspending, and rotating steps for a third support rail; and hanging a second inclined plank between the second support rail and the third support rail.

20. The method of claim 18, wherein suspending the second support rail from the third hook and the fourth hook comprises:

locking a first chain to a locking notch of the third hook and connecting the first chain to the second support rail; and locking a second chain to a locking notch of the fourth hook and connecting the second chain to the second support rail.

* * * * *